US006035947A

United States Patent [19]

Chung

[11] Patent Number: 6,035,947

[45] Date of Patent: Mar. 14, 2000

[54] PRIMARY SHAFT LOCKING DEVICE OF AN ELECTROMOTIVE TOOL

[76] Inventor: Lee Hsin-Chih Chung, No. 21-8, Shang San Cho Woo, Wuchang-Li, Chungli City, Tao Yuan Hsien, Taiwan

[21] Appl. No.: 09/205,358

[22] Filed: Dec. 4, 1998

[51] Int. Cl.$^{7}$ .................................................... B23B 45/00

[52] U.S. Cl. ......................... 173/93.5; 173/104; 173/205; 173/213; 173/216; 173/171

[58] Field of Search ............................ 173/93, 93.5, 205, 173/213, 216, 178, 104, 171

[56] References Cited

U.S. PATENT DOCUMENTS

| | | | |
|---|---|---|---|
| 2,684,738 | 7/1954 | Kaplan | 173/93.5 |
| 4,215,594 | 8/1980 | Workman, Jr. et al. | 173/178 |
| 4,619,162 | 10/1986 | Van Leare | 173/104 |
| 5,083,619 | 1/1992 | Giardino et al. | 173/93.5 |
| 5,538,089 | 7/1996 | Sanford | 173/216 |
| 5,908,076 | 1/1999 | Marcengill et al. | 173/205 |

*Primary Examiner*—Scott A. Smith

*Attorney, Agent, or Firm*—Bacon & Thomas, PLLC

[57] ABSTRACT

A primary shaft locking device of an electromotive tool is disclosed. A plurality of braking blocks are installed with a plurality of axially projected supporting pieces and a plurality of radially projected nose portions. An output shaft is installed within the receiving hole and a cam is installed in one end of the output shaft so that the cam is rotated synchronously with the output shaft. Furthermore, a driving disk attached to a speed changing gear set is installed, the disk surface of which is installed with a plurality of convex blocks having a fan shape. These convex blocks is matched with the fixing seat, and is arranged between the two supporting pieces installed on the braking blocks. Thereby, when the rotary is driven to rotate, at first, the convex block will rotate the supporting pieces in order that the braking block release from braking condition so as to drive the output shaft, the cam and the braking block to rotate at the same time. While when the driving disk is stopped, since the output shaft is rotated in the reverse direction, the cam will drive the convex portion of the braking blocks, thus a friction force will induce between the braking block and the inner wall of the fixing seat, thereby, the fixing seat is firmly fixed.

8 Claims, 5 Drawing Sheets

PRIMARY SHAFT LOCKING DEVICE OF AN ELECTROMOTIVE TOOL

FIELD OF THE INVENTION

The present invention relates to a primary shaft locking device of an electromotive tool, especially to a tool as power is supplied, the output shaft is driven to rotate, while as the power is turned off, the exterior force can not induce the output shaft to rotate, thereby, the tool can be easily attached and detached, further, the present invention can be used as a manual tool.

BACKGROUND OF THE INVENTION

In the prior art, the electromotive tool, such as an electric drilling device, is driven by electric power. The drilling device is not only used to clamp a drilling head for drilling a hole, but also used to clamp the head of a screw driver for screwing a screw. In the place easily providing with a power, the powered electric drilling device certainly can provide a powerful driving force. But for a place without power, or the receptacle is far away from the working place so that the electric wire is extraneously inconvenient to be connected, a charged electric drilling device can provide a useful selection. However, it is probable that the power of the drilling device is not sufficient or the power is interrupted suddenly, so that it can not used to drive a head or a screw driver, then the drilling device is necessary to be operated manually. However, since in the conventional drilling device, the active gear connected with the driving shaft of a motor is engaged directly with a gear set. Further, a passive gear engaged on the central shaft is driven by the gear set. Therefore, when the drilling device is used manually, the passive gear will become an "active gear", the power will send to the real active gear through the motor driving shaft. Therefore, the drilling head or the screw driver will rotate ineffectively in the original place. Namely, it can not be used as a manual drilling device.

Moreover, conventionally, in the electromotive tool, such as an electric drilling device for clamping a head of a tool, the clamping device installed on the front end thereof is engaged with an output shaft. Further, the clamping device is installed with a plurality of clamping palms and a rotary button coaxial with the output shaft. By rotating the rotary button, the palms are controlled to move to the center to clamp the tool head, or they are radially moved in the outward direction for releasing the tool head. Since the clamping device is installed on the output shaft, as the rotary button is rotated, one hand is necessary to hold a fixing head engaged with the output shaft, while another hand is used to rotate a rotary button. Namely, the operation is performed by two hands. Thus, it is very inconvenient in using.

SUMMARY OF THE INVENTION

Accordingly, the object of the present invention is to provide a primary shaft locking device of an electromotive tool. A plurality of braking blocks are installed with a plurality of axially projected supporting pieces and a plurality of radially projected nose portions. An output shaft is installed within the receiving hole and a cam is installed in one end of the output shaft so that the cam is rotated synchronously with the output shaft. Furthermore, a driving disk attached to a speed changing gear set is installed, the disk surface of which is installed with a plurality of convex blocks having a fan shape. These convex blocks are matched with the fixing seat, and is arranged between the two supporting pieces installed on the braking blocks. Thereby, when the rotary is driven to rotate, at first, the convex block will rotate the supporting pieces in order that the braking block releases from braking condition so as to drive the output shaft, the cam and the braking block to rotate at the same time. While when the driving disk is stopped, since the output shaft is rotated in the reverse direction, the cam will drive the convex portion of the braking blocks. Thus a friction force will be induced between the braking block and the inner wall of the fixing seat, thereby, the fixing seat is firmly fixed.

The various objects and advantages of the present invention will be more readily understood from the following detailed description when read in conjunction with the appended drawing.

DETAILED DESCRIPTION OF THE DRAWINGS

Figure 1:
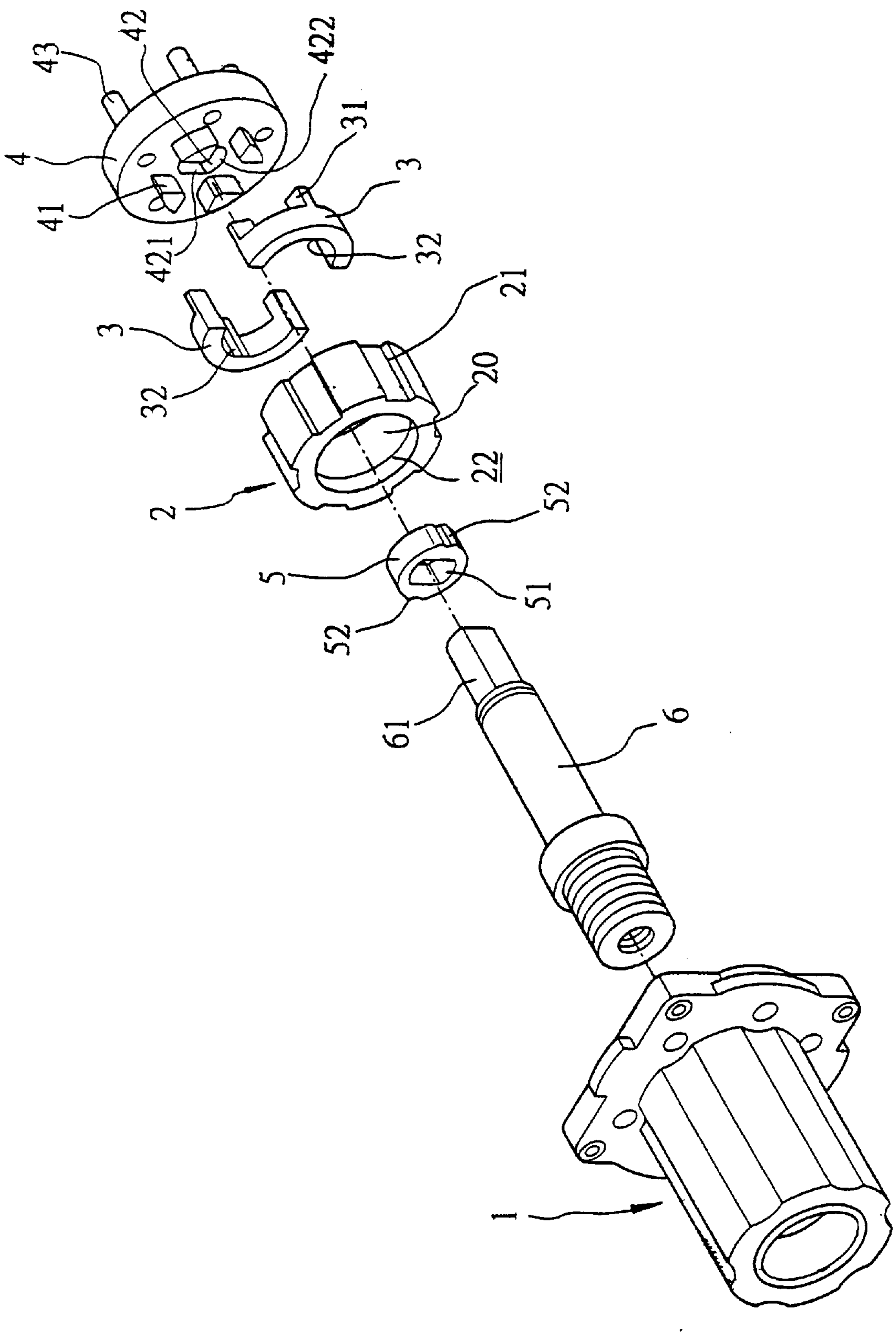
FIG. 1 is an assembled perspective view showing the relations of the locking device of the present invention.
Figure 2:
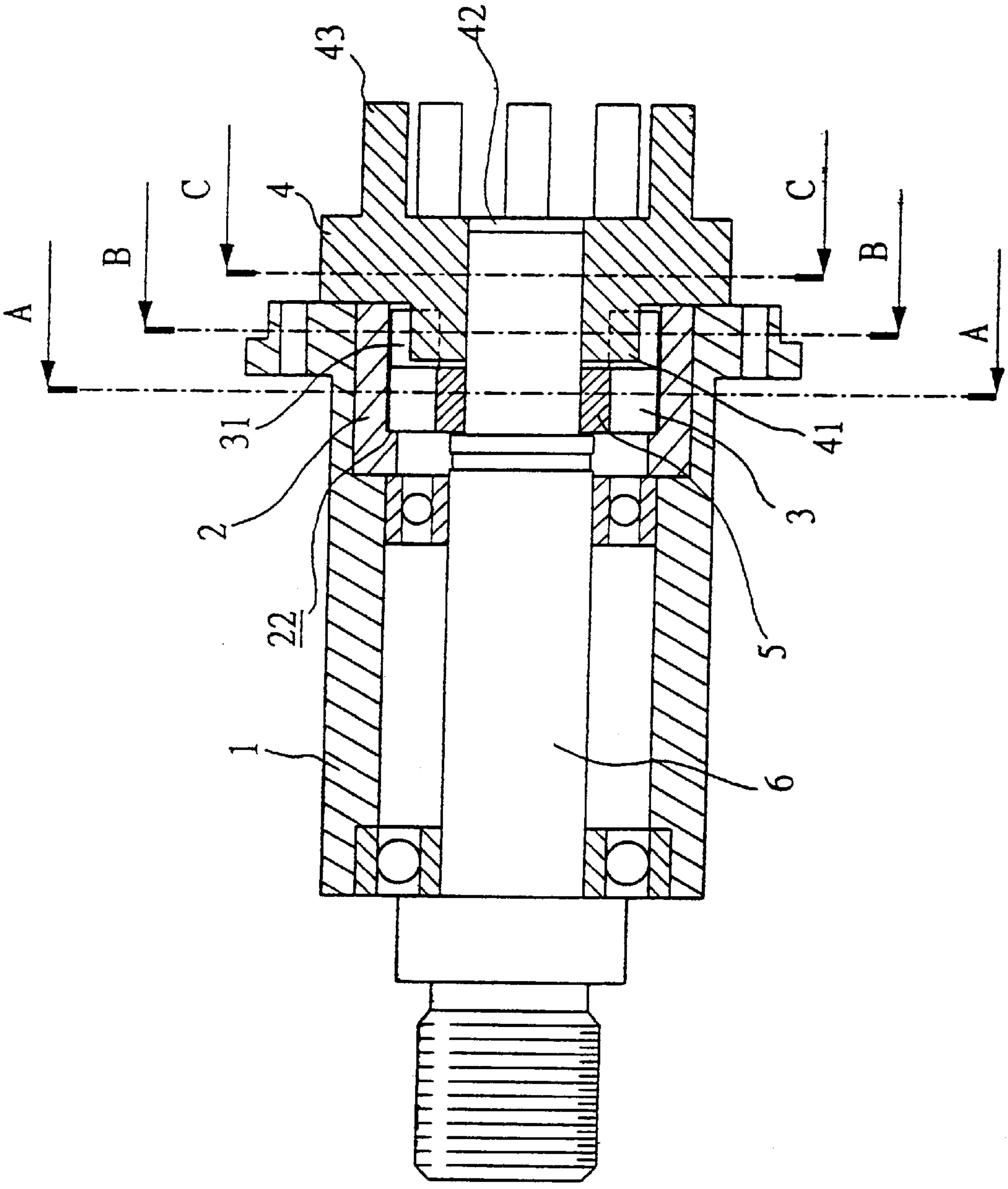
FIG. 2 is a plan cross sectional view showing the assembled components.
Figure 3:
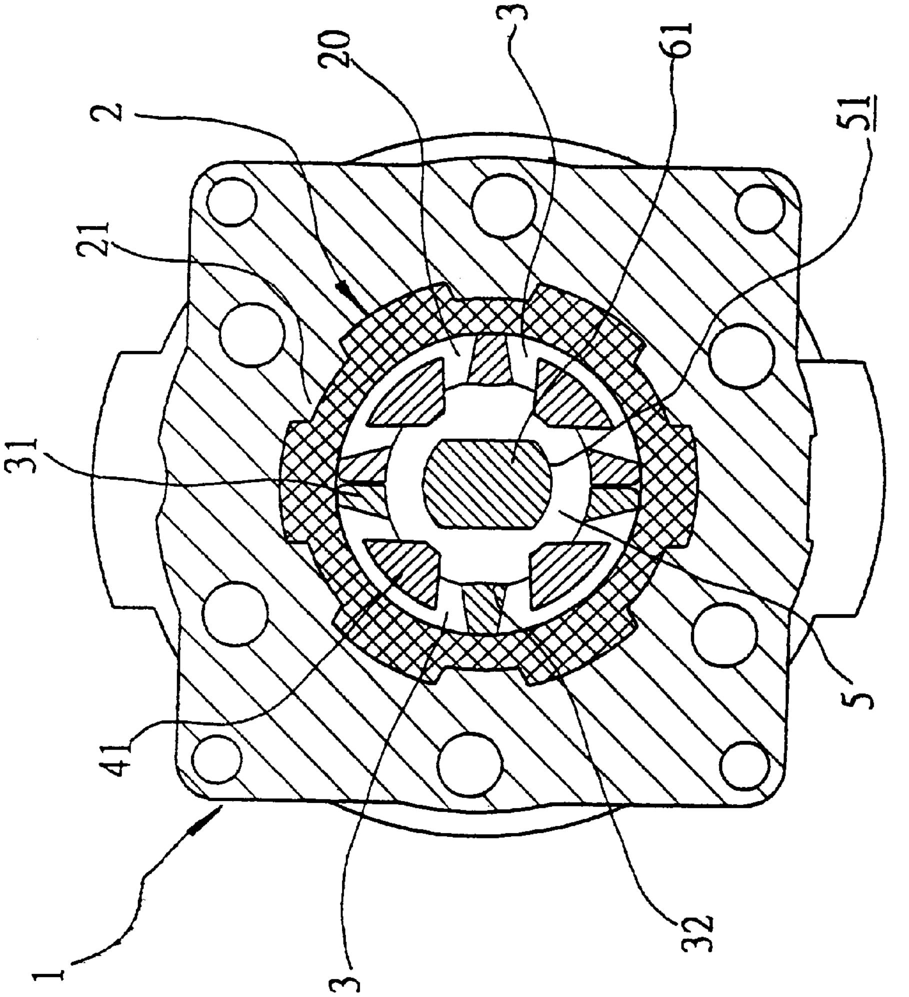
FIG. 3 is a plan cross sectional view along the line A—A of FIG. 2.
Figure 4:
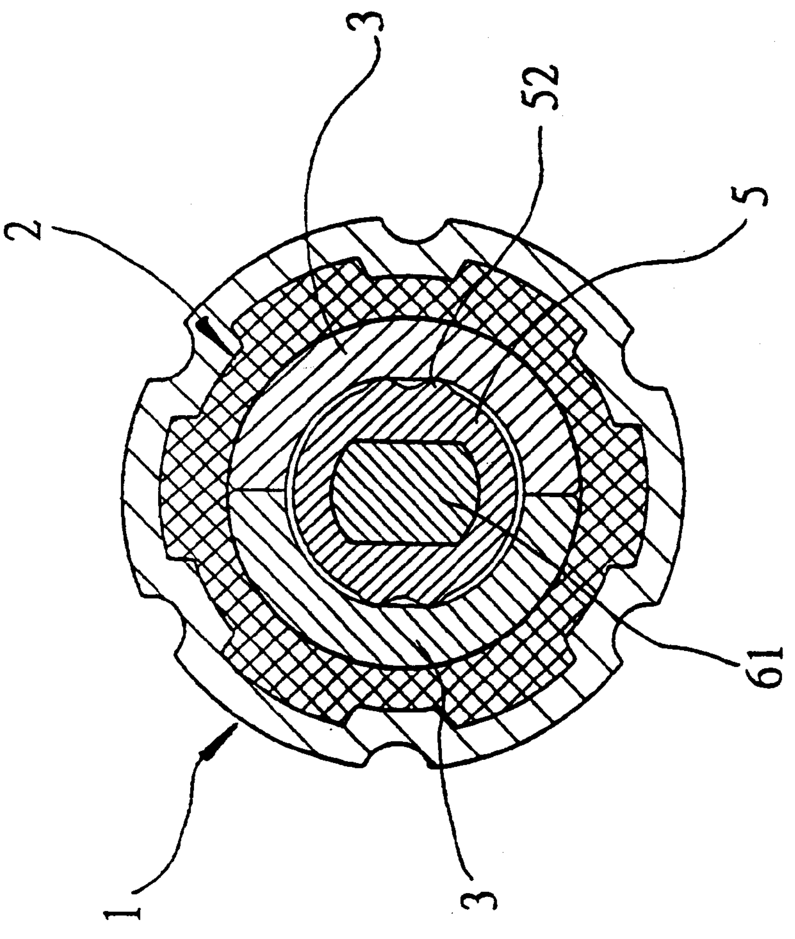
FIG. 4 is a plan cross sectional view along the line B—B of FIG. 2.
Figure 5:
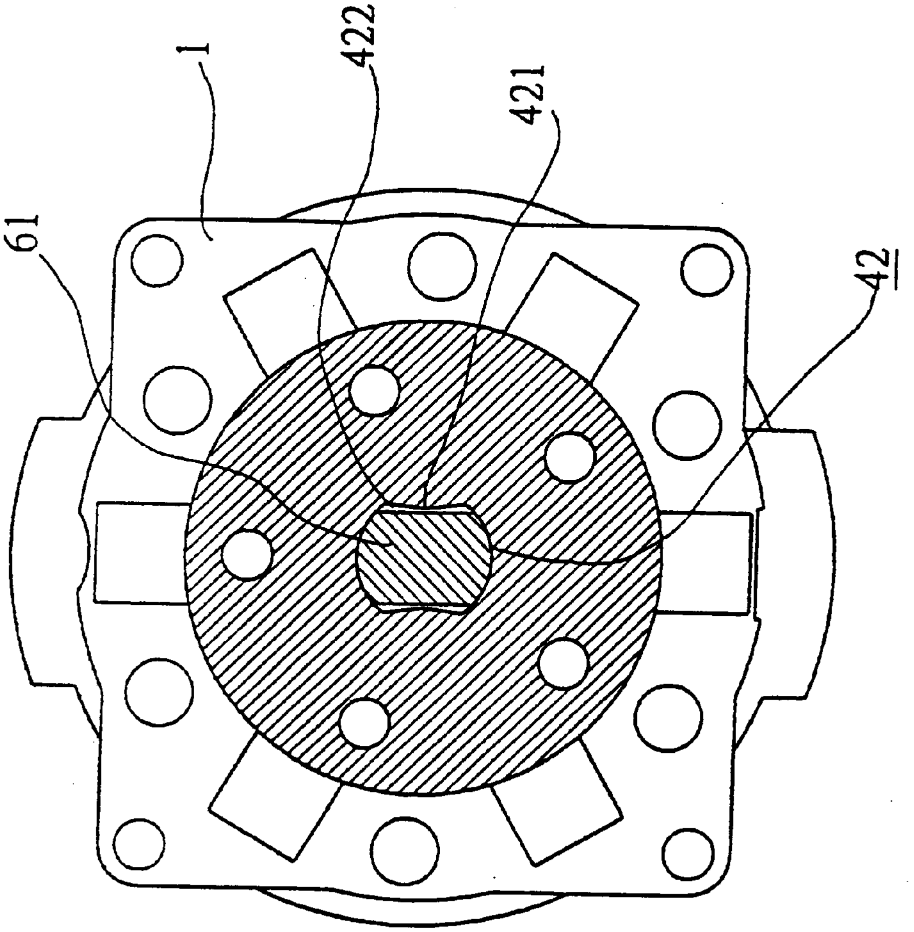
FIG. 5 is a plan cross sectional view along the line C—C of FIG. 2.

As shown in FIGS. 1 and 2, the primary shaft locking device of an electromotive tool of the present invention comprises a case seat 1 installed on the case of an electromotive tool (not shown). An output shaft 6 is installed within the seat 6 by a bearing 6 so that the output shaft 6 can rotate freely with respect to the case seat 1. The rear end 61 of the output shaft 6 has a non-circular shape viewing from the end portion thereof (in the embodiment of the present invention, the two opposite sides are cut as a plan). A space matching with a fixing seat 2 is formed in the case seat 1. A plurality of strips are installed on the periphery of the inner wall of the space. In a preferred embodiment, the fixing seat 2 has a cylindrical shape, and a plurality of grooves 21 with respect to the strip of the case seat are installed on the periphery of the outer wall surface. The fixing seat 2 can be directly inserted into the space of the case seat 1, and meanwhile, they are fixed by matching the strips with the grooves 21. Further, a receiving hole 20 is installed on the center of the fixing seat 2. An inner rim 22 with a smaller inner radius is formed on the front end of the receiving hole 20. A cam 5 is formed on the rear end 61 of the output shaft 6. The cam 5 may rotate synchronously with the output shaft 6 within the receiving hole 2 of the fixing seat 2. In a preferred embodiment, convex portions 52 are installed on the respective positions of the wheel surface. A through hole 51 corresponding to the shape of the rear end of the output shaft 6 is installed on the center of the cam 5 so that the through hole 51 is engaged in the rear end 61 of the output shaft 6 in order to be driven by the output shaft 6 to rotate synchronously. A plurality of cambered braking blocks 3 is further installed in the present invention. After all the braking blocks are disposed in the receiving hole 20 of fixing seat 2, the periphery of the outer ring is formed as a shape corresponding to that of the receiving hole 20. The rear side of each braking block 3 is installed with a plurality of supporting pieces 31 which are projected axially, which each of the concave surface thereof is installed with nose portions 32. In a preferred embodiment, the supporting pieces has a ladder shape and the front surface of each of the braking pieces is installed with three supporting pieces. In the present invention, a driving disk 4 is further provided for driving the output shaft 6 to rotate. On the center of the driving disk 4 is installed with a central hole 42 for being passed through by the rear end of the output shaft 6. A neck portion 421 is formed on the two sides on the central of the central hole 42. A plurality of convex blocks 41 are installed on the disk surface on the front end of the driving disk 4 and have a fan shape. A plurality of convex pillars 43 are installed on the disk surface on the rear end of the driving disk 4 for assembling with a small gear (not shown) for forming a planet gear so that the small gear will be engaged with another speed changing gear set to be driven so as to rotate. These blocks 41 can be disposed within the receiving hole 20 so that each block is located between two supporting pillars 31 (as shown in FIG. 4). Moreover, the limiting swinging angle of the rear end 61 of the output shaft 6 within the two fan shape space in the central hole 42 of the driving disk 4 (as shown in FIG. 3) is slightly larger than the swinging angle between the two adjacent supporting pieces 31 of the blocks 41 so that when the driven disk 4 is rotated, the convex block 4 will firstly contact with the inclined plane on the side of the supporting piece 31. FIG. 5 is a cross sectional view showing the assembled structure of the aforementioned components.

By the aforementioned structure, the motor installed on the electromotive tool will drive another speed changing gear set to rotate. The speed gear set further drives the driving disk 4 to rotate. Whenever the driving disk 4 rotates clockwise or counterclockwise, the inclined plane on the side of the block 41 will firstly contact the inclined plane on the side of the trapezoid supporting piece 31 so that the outer circular surface of the braking block 3 will not brake the inner surface of the receiving hole 20 of the fixing seat 2. Thus, the driving disk 4 can drive the output shaft 6, the braking block 3 and the cam 5.

If the present invention is used manually without any power, as a torque is applied to the output shaft 6, then the rear end of the output shaft 6 will drive the cam 5 to rotate. When the cam 5 is rotated, the convex portion 52 will push the nose portion 32 on the inner surface of the braking block 3 so that the braking block 3 will expand outwards. Thus the outer circular surface will be forced to contact the inner surface of the receiving hole 21 of the fixing seat 2 so that the driving disk 2 can not be driven to rotate. Therefore, the present invention is used as a manual tool. Moreover, since no power is supplied, as a torque is applied to the output shaft 6, the output shaft 6 will not rotate, thus, as the tool head of the rotating button combined with the clamping tool (not shown) of the output shaft 6 is updated, this is performed by only one hand (in the prior art, another hand must hold the fixing head on the output shaft). Thus, the applications of the present invention is further extended.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A primary shaft locking device of an electromotive tool comprising:
   - a case seat;
   - an freely rotary output shaft installed within the case seat;
   - a fixing seat firmly installed within the case seat;
   - a cam on the rear end of the output shaft and which is rotated synchronously with the output shaft;
   - a plurality of braking blocks within the fixing seat and installed with a plurality of axially projected supporting pieces and a plurality of radially projected nose portions;

- a driving disk installed with a central hole for being penetrated by the rear end of the output shaft, and a neck portion being formed between the two opposite sides on the center of the central hole, a plurality of convex blocks being installed on the disk surface of the driving disk, these convex blocks being suitable for the fixing seat, and each convex block being arranged between two supporting pieces of the braking block;
   - wherein when the rotary disk is driven to rotate, at first, the convex block will rotate the supporting pieces in order that the braking blocks is released from braking condition so as to drive the output shaft, the cam and the braking block to rotate at the same time, then the cam will drive the convex portion of the braking block, thus a friction force will be induced between the braking block and the inner wall of the fixing seat, thereby, the fixing seat is firmly fixed.

2. The primary shaft locking device of an electromotive tool as claimed in claim 1, wherein a plurality of grooves are installed on the outer wall of the fixing seat, and a plurality of respective strips are installed on the inner wall surface of the case seat, after the fixing seat is directly engaged with the case seat, it is fixed by matching the strips to the grooves.

3. The primary shaft locking device of an electromotive tool as claimed in claim 1 or 2, wherein a circular receiving hole is installed on the fixing seat so that all the braking blocks and the convex blocks are received within the receiving hole.

4. The primary shaft locking device of an electromotive tool as claimed in claim 3, wherein a front rim with a smaller inner diameter is installed on the front end of the receiving hole of the fixing seat so that when the braking blocks have disposed into the receiving hole, it will be confined by the inner rim and retained within the receiving hole.

5. The primary shaft locking device of an electromotive tool as claimed in claim 3, wherein the braking block has a cambered shape, after the braking block is wholly disposed within the receiving hole of the fixing seat, the periphery thereof is exactly correspondent to the circular shape of the receiving hole.

6. The primary shaft locking device of an electromotive tool as claimed in claim 1, wherein the supporting piece installed on the braking block has a trapezoid shape, and the convex block installed on the driving disk has a fan shape, by the inclined plane of the fan shape to contact with the inclined plane of the side of the supporting piece, the supporting piece is moved, thus the braking condition is released.

7. The primary shaft locking device of an electromotive tool as claimed in claim 1, wherein the rear end of the output shaft has a non-circular shape, and the through hole of the cam is correspondent to the shape of the end portion on the rear end of the output shaft, so that they are engaged directly and are driven by each other.

8. The primary shaft locking device of an electromotive tool as claimed in claim 1, wherein the swinging angle of the rear end of the output shaft within the central hole of the driving disk is confined by the swinging angle between two adjacent supporting pieces, thus when the driving disk rotates, the convex block will firstly contact with the supporting block to release the braking condition.

* * * * *